United States Patent
Hicks et al.

(10) Patent No.: US 7,288,148 B2
(45) Date of Patent: Oct. 30, 2007

(54) RAPID HARDENING HYDRAULIC CEMENT FROM SUBBITUMINOUS FLY ASH AND PRODUCTS THEREOF

(75) Inventors: James K. Hicks, Montgomery, TX (US); Ryan M. Scott, Conroe, TX (US)

(73) Assignee: Cemex, Inc., Houston, TX (US)

( * ) Notice: Subject to any disclaimer, the term of this patent is extended or adjusted under 35 U.S.C. 154(b) by 0 days.

(21) Appl. No.: 11/057,329

(22) Filed: Feb. 11, 2005

(65) Prior Publication Data

US 2005/0241537 A1 Nov. 3, 2005

Related U.S. Application Data

(60) Provisional application No. 60/544,717, filed on Feb. 13, 2004.

(51) Int. Cl.
*C04B 7/26* (2006.01)
*C04B 14/00* (2006.01)

(52) U.S. Cl. .................. 106/705; 106/706; 106/708; 106/DIG. 1

(58) Field of Classification Search .............. 106/705, 106/706, 708, DIG. 1
See application file for complete search history.

(56) References Cited

U.S. PATENT DOCUMENTS

| 4,028,130 A * | 6/1977 | Webster et al. ............. 106/697 |
| 4,842,649 A | 6/1989 | Heitzmann et al. ........ 106/706 |
| 4,997,484 A | 3/1991 | Gravitt et al. .............. 106/708 |
| 5,997,632 A | 12/1999 | Styron ........................ 106/705 |
| 6,482,258 B2 * | 11/2002 | Styron ........................ 106/709 |
| 2004/0231566 A1 | 11/2004 | Wang et al. ................ 106/705 |

FOREIGN PATENT DOCUMENTS

| DE | 19932909 A1 * | 1/2001 |
| GB | 2217316 A * | 10/1989 |
| JP | 9-118881 A * | 5/1997 |
| WO | WO00/50358 A1 * | 8/2000 |
| WO | WO03/070655 A1 * | 8/2003 |

OTHER PUBLICATIONS

Derwent Abstract No. 2000-443201, abstract of Chinese Patent Specification No. 1083406C (Apr. 2002).*
Derwent Abstract No. 2003-854865, abstract of Chinese Patent Specification No. 1442385A (Sep. 2003).*

* cited by examiner

*Primary Examiner*—Anthony J. Green
(74) *Attorney, Agent, or Firm*—Howrey, LLP

(57) ABSTRACT

A rapid hardening hydraulic cement is provided that is made substantially exclusively from a subbituminous fly ash with no portland cement or other strengthening aid.

23 Claims, No Drawings

RAPID HARDENING HYDRAULIC CEMENT FROM SUBBITUMINOUS FLY ASH AND PRODUCTS THEREOF

This application claims benefit of U.S. Provisional Application No. 60/544,717 filed Feb. 13, 2004, the entire disclosure of which is incorporated herein by reference.

BACKGROUND OF THE INVENTION

1. Field of the Invention

The present invention is directed generally to a rapid-hardening hydraulic cement composition and related products. More particularly, the present invention is directed to a rapid hardening hydraulic cement composition comprising subbituminous fly ash and having no portland cement.

2. Technical Background

Electrical generation stations throughout the world burn one or more types of coal to produce electricity. One by-product of coal combustion is an inorganic residue known as "fly ash" or "pulverized fuel ash." Individual ash particles are very small (like face powder), and are carried up and out with the flow of combustion exhaust gases; hence the term "fly" ash. Thus, fly ash has been defined as the finely divided mineral residue resulting from the combustion of ground or powdered coal.

Fly ash is a "pozzolan", i.e., a material containing silica, alumina and calcium that, in the presence of water, will chemically combine with free lime contained in either the fly ash or other components to produce a material with cementious properties. Some fly ashes contain sufficient calcium compounds to be self-hardening, while others require the addition of calcium (usually in the form of cement or lime) to harden. There are two main types of fly ash: Class F (low lime) and Class C (high lime). Class F fly ash contains silica, aluminum and iron in combinations of greater than 70% and possesses little or no cementitious value when used alone but will, under appropriate conditions, chemically react with calcium hydroxide at ordinary temperatures to form cementitious compounds. Class F fly ash is typically associated with eastern and midwestern U.S. coals, such as anthracite or bituminous coal. In comparison, Class C fly ash generally contains more calcium and less iron than Class F fly ash, and has a lime (CaO) content in the range of 15% to 30%. Thus, Class C fly ash is cementious or self-hardening. Class C Fly ash is usually associated with western U.S. coals, such as lignite or subbituminous coal.

Fly ash is collected from the combustion gases using a variety of means, such as electrostatic precipitators, FGD systems or baghouses. Not surprisingly, fly ash accumulates rapidly and can cause enormous waste disposal problems. Consequently, there has been a tremendous effort to find suitable recycling uses for fly ash as alternatives to landfilling.

Historically, fly ash has been used as a strengthening additive in portland cement. Portland cement requires great amounts of energy for manufacture and generally speaking, for each ton of portland cement produced, one ton of carbon dioxide is emitted. Therefore, the use of fly ash as a replacement for all or some of the portland cement leads to the useful utilization of a landfill material as well as a reduction in the energy and $CO_2$ emissions associated with portland cement production. Using fly ash in this manner bestows a great benefit to society in the form of resource conservation and environmental protection.

The building materials industry is a leader in utilizing fly ash in cement and concrete. For example, fly ash is disclosed for use in cement compositions in U.S. Pat. No. 4,842,649 to Heitzmann et al. The composition contains from 50 parts to about 80 parts portland cement; from 13 parts to about 35 parts fly ash; and from 1 part to about 5 parts potassium carbonate. The composition may additionally include up to about 10 parts metakaolin; up to about 6 parts slag; and up to 4 parts of an admixture.

U.S. Pat. No. 4,997,484 to Gravitt et al. discloses a cement that uses 80.8 to 99 parts of Class C fly ash to achieve high strength in a short time, usually less than thirty minutes, when cured at room temperature.

U.S. Pat. No. 5,997,632, filed by the applicant herein, discloses blended hydraulic cement that comprises about 85 to 99.7 weight percent subbituminous fly ash. The full and complete disclosure of that patent is incorporated herein by reference for all purposes as if fully set forth.

U.S. patent application Ser. No. 10/249,935, filed May 20, 2003, discloses blended hydraulic cement that comprises vitrified fly ash blended with portland cement or lime.

The inventions disclosed and claimed herein advance and improve the technology set forth above in the form of a rapid-hardening hydraulic cement made for fly ash that utilizes no portland cement.

SUMMARY OF THE INVENTION

The present invention may be implemented in a variety of embodiments as set forth in the appended claims. In one aspect, the present invention provides a rapid hardening hydraulic cement containing substantially exclusively subbituminous fly ash, an accelerant, such as citric acid, potassium carbonate and sodium citrate, and a working aid, such as kaolin and attapulgite. In another aspect, the rapid-hardening cement contains class C fly ash in combination with a non-class C fly ash having higher lime and sulfur content than the class C fly ash, such as limestone scrubber fly ash. In another aspect, the present invention provides a mortar, grout, or concrete composition in which the rapid-hardening cement is mixed with aggregate.

DETAILED DESCRIPTION OF ILLUSTRATIVE EMBODIMENTS

Specific embodiments incorporating one or more aspects of the invention are described in detail below, but not all features of an actual implementation are set forth. It will be understood by those of ordinary skill in this art that in the development of any such commercial embodiment, numerous implementation-specific decisions must be made to achieve the developers' specific goals, such as compliance with system-related and business-related constraints, which will vary from one implementation to another. Moreover, such a development effort, while complex and time-consuming, but would nevertheless be a routine undertaking for those of ordinary skill in the art having the benefit of this disclosure. Accordingly, the invention is susceptible to various modifications and alternative forms, and it should be understood that the invention is not intended to be limited to the particular forms disclosed in detail herein. Rather, the invention is intended to cover all modifications, equivalents and alternatives falling within the scope of the invention as defined by the appended claims.

In general terms, the present invention provides a rapid-hardening hydraulic cement made substantially from fly ash without the intentional addition of portland cement. The fly ash is preferably Class C fly ash and most preferably a blend of Class C fly ash and a subbituminous fly ash having a lime and sulfur content greater than that found in Class C ash. The cement also includes an accelerant, such as citric acid, that reacts with the fly ash minerals to effect rapid hardening. The cement will set within about 10 minutes of mixing with water, and preferably within about 8 minutes from water addition or about 3 minutes from the end of mixing. The cement may be mixed with a fine aggregate, such as sand, to form a mortar or a grout, or with a coarse aggregate to form concrete. Mixing equal parts 6-10 mesh sand and 20 mesh sand with the cement of the present invention makes a preferred mortar/grout product. Other aspects of the present invention are presented below.

According to ASTM C 618, the chemical requirements to classify fly ash as Class C or Class F are:

| Properties | Fly Ash Class | |
| --- | --- | --- |
| | Class F | Class C |
| Silicon dioxide ($SiO_2$), aluminum oxide ($Al_2O_3$) and iron oxide ($Fe_2O_3$), min, % | 70.0 | 50.0 |
| Sulfur trioxide ($SO_3$), max, % | 5.0 | 5.0 |
| Moisture Content, max, % | 3.0 | 3.0 |
| Loss on ignition, max, % | 6.0 | 6.0 |

A typical chemical analysis for Class F & Class C fly ash, on a weight percentage basis, is as follows:

| Oxide | Class F | Class C |
| --- | --- | --- |
| $SiO_2$ | 49.10 | 53.79 |
| $Al_2O_3$ | 16.25 | 15.42 |
| $Fe_2O_3$ | 22.31 | 5.00 |
| $TiO_2$ | 1.09 | 1.68 |
| CaO | 4.48 | 18.00 |
| MgO | 1.00 | 3.40 |
| $Na_2O$ | 0.05 | 0.50 |
| $K_2O$ | 1.42 | 0.50 |
| $SO_3$ | 0.73 | 1.44 |
| LOI | 2.55 | 0.80 |
| Other | 1.02 | 0.27 |

A composition according to the present invention contains between about 85% and 100% subbituminous fly ash, such as a Class C fly ash. Alternately, and preferably, the fly ash is a blend of Class C fly ash with a subbituminous fly ash having a higher sulfur content than allowed by the parameters of Class C ash. For example, the presently preferred non-Class C fly ash is obtained from a power plant that burns limestone along with the subbituminous coal, which creates a fly ash having a higher sulfur and lime content than typically found in Class C ash. For example, pulverized limestone may be injected into the hot gases as they exit the plant combustor and enter the furnace. Through flash calcination, the limestone is converted into lime, which reacts with the sulfur compounds in the exhaust gases to form calcium sulfate. For purposes of this disclosure, this non-Class C fly ash will be referred to generically herein as a Limestone Scrubber fly ash. This name is merely a shorthand label of convenience and is not intended to limit the source from which this subbituminous fly ash is obtained or how it is made.

Typical composition and properties for Limsestone Scrubber fly ash useful with the present invention is presented below.

| Component/Property | Percent |
| --- | --- |
| $SiO_2$ | 33.87 |
| $Al_2O_3$ | 19.83 |
| $Fe_2O_3$ | 6.72 |
| Subtotal | 59.92 |
| CaO | 27.69 |
| MgO | 6.13 |
| $Na_2O$ | 1.46 |
| $SO_3$ | 1.93 |
| LOI | 0.20 |
| Specific Gravity | 2.67 |
| Fineness (+325 mesh) | 11.20 |

It has been found that the ratio of Class C fly ash to Limestone Scrubber fly ash may range from 1:0 (i.e, entirely Class C fly ash) to about 1:1. Preferably, the blend ratio is two parts Class C fly ash to 1 part Limestone Scrubber fly ash (i.e., 2:1). Other pozzolans, such as clays, may be used to supplement the calcium and sulfur contents of the Class C fly ash if a Limestone Scrubber fly ash is not used.

One or more accelerants may be used with the cement of the present invention. Citric acid and potassium carbonate, lithium carbonate and sodium carbonate are suitable accelerants as are equivalent products, such as salts and other forms of the accelerants listed. When citric acid is used, it will typically account for from about 1 to about 3 weight percent of the cement composition. It is presently preferred that potassium carbonate be used in conjunction with citric acid in a ratio of about 1:1 to 2:1, most preferably at a ratio of about 1.4 parts potassium carbonate to 1 part citric acid. The accelerant used may be any of its available grades, including fine crystal, liquid or powder.

It has been found that sodium citrate is beneficial as an accelerant when used in combination with another accelerant, such as citric acid or citric acid and potassium carbonate. The use of sodium citrate by itself without another accelerant has not been found to benefit the present invention, although such use is not excluded in the invention. When used, sodium citrate may account for 0.5% to 2% by weight. It has been found that about 1% sodium citrate has the best synergistic effect on the other accelerants.

The present invention may also benefit from the addition of an alumina-bearing working aid. Such aids include virtually any clay, such as attapulgite, kaolin, meta-kaolin, novaculite (also available as Novacite) and bentonite, and bauxite, lime and hydraulic lime.

Attapulgite is a well-known magnesium aluminum silicate clay of very fine particle size. It is also known as palygorskite or Fuller's Earth and is closely related to sepiolite mineral. The high surface area of attapulgite (and sepiolite) gives it the ability to absorb large amounts of water. Attapulgite is named after Attapulgus, Ga., one of the few places where it occurs.

Kaolin is one of several types of clay, and is commonly referred to as China Clay or Paper Clay. It is a hydrated silica of alumina with a composition of approximately 46% $SiO_2$; 40% $Al_2O_3$, and 14% $H_2O$. Metakaolin is kaolin that has been processed by dehydroxylization through the application of heat over a defined period of time.

Bentonite is a claylike mineral consisting largely of montmorillonite, and characterized by its high absorptive power and active colloidal properties. The name refers to its discovery in Benton, Wyo.

Bauxite is a naturally occurring, heterogeneous material composed primarily of one or more aluminum hydroxide minerals, plus various mixtures of silica, iron oxide, titania, aluminosilicate, and other impurities in minor or trace amounts.

The additional alumina content of these working aids contributes, among other things, to the quick setting nature of the present invention. The working aid or aids should account for about 1-10% on a weight basis of the cement mix and more preferably about 2 to about 7%. In one presently preferred embodiment, a combination of kaolin and attapulgite is used as the working aid. The kaolin is used primarily to supply alumina and secondarily for its workability properties. Attapulgite is used primarily for its workability properties and secondarily for its alumina content. In that particular embodiment of the present invention, about 0.5% by weight of attapulgite and about 2.5% by weight of kaolin is used.

Those of ordinary skill in this art will appreciate that various cement additives may be used with the present invention to create desired commercial properties. For example, bonding aids, curing aids and sealing aids all may be used successfully with the present invention. A water dispersible polymer, such as the vinyl acetate copolymer EV 2000 marketed by Elotex AG, is one such additive. Anti-shrinkage additives, such as Metolat P 871 marketed by Ulta Additives, Inc., and wetting agents, such as Westvaco's Reax 6SN, may also be used successfully.

Significantly, compositions of the present invention do not rely on strength-enhancing additives such as portland cement, ground cement clinker or ground slag, but rather rely substantially exclusively upon the subbituminous fly ash or a mixture thereof. Additionally, because compositions of the present invention are rapid-hardening hydraulic cements, they do not employ retarding agents that would extend the setting time appreciably past 10 minutes from water addition.

One example of the many embodiments of a rapid hardening hydraulic cement made pursuant to the present invention is set forth in the following tables.

| Component | Weight percent |
|---|---|
| Class C Fly Ash | 59.65 |
| Limestone Scrubber Fly Ash | 30.77 |
| TOTAL FLY ASH | 90.42 |
| Potassium Carbonate | 2.51 |
| Citric Acid | 1.75 |
| Sodium Citrate | 1.00 |
| Kaolin | 2.47 |
| Attapulgite | 0.50 |
| Elotex EVA 2000 | 0.10 |
| Metallat P 871 | 0.25 |
| WestVaco Reax SN | 0.30 |
| Coloring agent | 0.70 |
| TOTAL CEMENT | 100.00 |

Water may be mixed in at convention rates, such as 0.2 parts of water to 1 part of cement.

| Test Interval | Compressive Strength, psi |
|---|---|
| 1 hour | 4,750 |
| 2 hours | 5,800 |
| 3 hours | 6,250 |
| 24 hours | 8,000 |
| 7 days | 10,500 |
| 28 days | 12,00 |

It will be appreciated that the rapid-hardening hydraulic cement of the present invention may be combined with small aggregrate or large aggregrate to create a mortar, grout or concrete. It has been surprisingly found that a using mixture of 6-10 mesh sand with 20 mesh sand in about a 1:1 ratio produces a cement product having properties superior to that made from either 6-10 mesh sand alone or 20 mesh sand alone.

The present invention has been disclosed by way of the illustrative examples and preferred embodiments detailed above. However, the breadth of the invention and its many commercial applications are not limited to the above examples and embodiments. The plain meaning of the following claims together with all equivalents and insubstantial modifications prescribe the scope of protection to be afforded the present invention.

What is claimed is:

1. A cement comprising:
    at least about 85% by weight of a subbituminous fly ash, wherein the subbituminous fly ash comprises a first fly ash that is a class C fly ash and a second fly ash other than a class C fly ash, said second fly ash containing a higher weight fraction of calcium oxide and a higher weight fraction of sulfur trioxide than said first fly ash;
    less than about 5% by weight of an accelerant; and
    about 1% to about 10% by weight of at least one alumina-bearing working aid,
    said cement exhibiting a setting time of about ten minutes or less after mixing with water.

2. A cement according to claim 1, wherein said second fly ash contains more than about 18% calcium oxide and more than about 1.44% sulfur trioxide.

3. A cement according to claim 1, wherein the second fly ash comprises greater than about 5% sulfur trioxide.

4. A cement according to claim 1, wherein the second fly ash comprises limestone scrubber fly ash.

5. A cement according to claim 1, wherein the weight ratio of said first fly ash to said second fly ash is greater than 1:1.

6. A cement according to claim 5, wherein said weight ratio is about 2:1.

7. A cement according to claim 1, wherein said accelerant is selected from the group consisting of citric acid, alkali metal carbonates, sodium citrate, and mixtures thereof.

8. A cement according to claim 7, wherein said accelerant comprises citric acid and potassium carbonate.

9. A cement according to claim 8, wherein the weight ratio of said potassium carbonate to said citric acid is about 1:1 to about 2:1.

10. A cement according to claim 9, wherein said weight ratio is about 1.4 to 1.

11. A cement according to claim 8, further comprising about 0.5 weight percent to about 2 weight percent sodium citrate.

12. A cement according to claim 11, comprising about 1 weight percent of said sodium citrate.

13. A cement according to claim 7, wherein said accelerant is selected from the group consisting of citric acid, alkali metal carbonates, and mixtures thereof, said cement further comprising about 0.5% to about 2% sodium citrate.

14. A cement according to claim 1, wherein said working aid is a clay selected from the group consisting of attapulgite, kaolin, meta-kaolin, novaculite, bentonite, and mixtures thereof.

15. A cement according to claim 14, wherein said working aid comprises about 0.5 weight percent attapulgite and about 2.5 weight percent kaolin.

16. A cement according to claim 1, wherein said working aid is selected from the group consisting of bauxite, lime, and hydraulic lime.

17. A cement according to claim 1, comprising about 2 weight percent to about 7 weight percent of said at least one working aid.

18. A cement according to claim 1, further comprising at least one cement additive selected from the group consisting of bonding aids, curing aids, sealing aids, anti-shrinking additives, wetting agents, and mixtures thereof.

19. A cement according to claim 1, wherein said setting time is within about eight minutes after water is added to said cement.

20. A cement according to claim 1, wherein said setting time is within about three minutes after termination of a mixing operation wherein said cement is mixed with water.

21. A concrete composition comprising a cement according to claim 1 in combination with coarse aggregate.

22. A mortar or grout composition comprising a cement composition according to claim 1 in combination with fine aggregate.

23. A mortar or grout composition according to claim 22, wherein said fine aggregate comprises substantially equal parts of 20 mesh sand and 6-10 mesh sand.

* * * * *